United States Patent [19]

Droulon

[11] Patent Number: 5,301,569
[45] Date of Patent: Apr. 12, 1994

[54] DEVICE FOR LOCKING A RECTILINEAR DISPLACEMENT MECHANICAL JACK INCORPORATING AN INERTIA SAFETY LOCKING MEMBER

[75] Inventor: Georges Droulon, Orne, France

[73] Assignee: Bertrand Faure Automobile "BFA", Essonne, France

[21] Appl. No.: 27,749

[22] Filed: Mar. 8, 1993

[30] Foreign Application Priority Data

Mar. 6, 1992 [FR] France .................. 92 02701

[51] Int. Cl.⁵ ................................ G05G 5/16
[52] U.S. Cl. ........................ 74/531; 74/567; 74/569; 188/67; 297/375
[58] Field of Search ............ 74/531, 567, 569, 527, 74/528, 526; 188/67; 297/375

[56] References Cited

U.S. PATENT DOCUMENTS

| | | | |
|---|---|---|---|
| 2,750,994 | 6/1956 | Howell | 297/375 |
| 3,793,903 | 2/1974 | Pellman | 188/67 |
| 3,876,248 | 4/1975 | Gillentine | 297/375 X |
| 3,893,730 | 7/1975 | Homier et al. | 188/67 X |
| 4,099,777 | 7/1978 | Chekirda | 297/375 |
| 4,387,926 | 6/1983 | Van Eerden et al. | 74/531 X |
| 4,552,405 | 11/1985 | Wiers | 188/67 X |
| 4,589,301 | 5/1986 | Griner | 188/67 X |
| 4,738,156 | 4/1988 | Pipon et al. | 74/531 |
| 4,865,386 | 9/1989 | Detloff et al. | 297/375 |
| 4,898,424 | 2/1990 | Bell | 297/375 X |
| 5,052,752 | 10/1991 | Robinson | 297/375 X |

FOREIGN PATENT DOCUMENTS

| | | | |
|---|---|---|---|
| 0069207 | 1/1983 | European Pat. Off. | 297/375 |
| 0234160 | 9/1987 | European Pat. Off. | |
| 3420103 | 5/1984 | Fed. Rep. of Germany. | |
| 3508739 | 3/1985 | Fed. Rep. of Germany. | |
| 1466417 | 1/1967 | France | 297/375 |
| 2574721 | 6/1986 | France. | |
| 2652129 | 3/1991 | France. | |
| 1178225 | 1/1970 | United Kingdom | 297/375 |

Primary Examiner—Vinh T. Luong
Attorney, Agent, or Firm—Robert W. Becker & Associates

[57] ABSTRACT

At least one rod is normally locked by toothed rollers cooperating with toothed slanted inner portions of V-shaped locking members controlled by a locking cam. The V-shaped locking members are guided within an inner casing of a polygonal shape that has a lower portion for supporting the rod. The lower portion comprises two slanted inner elements which cooperate with a fluted roller placed underneath the underside of the rod. Under an impact, the fluted roller is locked underneath the rod by moving upwardly along one of the two slanted inner elements.

5 Claims, 10 Drawing Sheets

DEVICE FOR LOCKING A RECTILINEAR DISPLACEMENT MECHANICAL JACK INCORPORATING AN INERTIA SAFETY LOCKING MEMBER

FIELD OF THE INVENTION

The present invention relates to a device for locking a rectilinear displacement mechanical jack incorporating an inertia safety locking member, such a mechanical jack being especially used in land, water or air vehicles, either for adjusting inclination of the back portion of a seat or for adjustment of the seat portion of the seat with respect to its height or its forward and rearward positioning.

BACKGROUND OF THE INVENTION

A locking device for a mechanical jack of the above-mentioned kind is known in particular from French publication 2 652 129, but for manufacturers incorporating such seats in various vehicles it is desirable that these mechanisms be provided with an additional safety locking member useful in situations when, due to a false manipulation or lack of attention, the primary locking device of the respective jack is not perfectly engaged, the additional safety locking member automatically locking the jack by inertia when there is either a lateral impact or a front or rear impact.

It is necessary to have a safety device enabling an instantaneous locking of the rod of the jack with respect to the casing when there is an impact. Actually, it may happen, upon an abrupt braking of the respective vehicle, that the adjusting jack(s) of one of the seats are unlocked and therefore either the back portion or the seat portion of the seat can move with a projection, the speed of which projection being equal to the initial speed of the vehicle, thereby possibly causing a sever injury to the passenger sitting on the respective seat.

The present invention remedies these disadvantages by providing each mechanical jack not only with a conventional (primary) locking device but also with a safety locking member working by means of inertia.

Moreover, in addition to the above mentioned safety locking member working by inertia, there is also suggested a device having a safety locking member which is entrained by a pendular mass acting when the deflection is at least 30° with respect to the vertical defined by the axis of the pendular mass.

Finally and in addition to the above device provided with an inertia safety locking member with a fly weight, there is provided a position memory member which allows the use of these seats in two-door vehicles by enabling, in a rapid movement, the disengagement of a front seat when the rear passengers enter or leave the vehicle.

SUMMARY OF THE INVENTION

The device for locking a rectilinear displacement mechanical jack according to the present invention is primarily characterized by:

a casing of a substantially polygonal shape having a lower and an upper portion, the lower portion having two oppositely slanted inner elements having a point of convergence at lower ends thereof;

at least one rod guided in the lower portion of the casing above the oppositely slanted inner elements;

a fluted roller resting in a displaceable manner at the point of convergence, the fluted roller, upon impact, rolling up one of the oppositely slanted inner elements and engaging the rod for locking it;

V-shaped locking members with an inner space with toothed inner slanted portions connected in a displaceable manner in the casing;

the upper portion of the casing having slanted guides for the V-shaped locking members;

a cam rotatably connected within the casing and positioned between the V-shaped locking members for controlling displacement of the V-shaped locking members along the guides; and toothed rollers, one toothed roller positioned in the inner space of each aid V-shaped locking member and cooperating with the toothed inner slanted portions, wherein in an initial locked position of the rod the toothed rollers are forced by the V-shaped locking members onto the rod.

Preferably, the oppositely slanted inner elements have an angle of inclination of between 15° and 30°.

Advantageously, the device further comprises a shaft and a pendular member with a first and a second end. The cam and the first end of the pendular member are connected to the shaft. The pendular member has a fly-weight at the second end and an intermediate portion with a window. The fluted roller has an axially extending pin cooperating with the window. Each oppositely slanted inner element has a toothing for cooperating with the fluted roller. On impact, the pendular member is moved from an initial position in the direction of one of the toothings of the oppositely slanted inner elements and the roller is displaced in the same direction for engaging and locking the rod.

The casing has cutouts for guiding the pin of the fluted rollers.

In another embodiment, the device further comprises a memory member comprising a housing slidably connected to the rod and a hook-shaped member pivotably connected to the housing. A lever is connected to the shaft and has an abutment. The lever engages the hook-shaped member in a memorized position. A finger is connected pivotably to the casing and engages the abutment of the lever for locking the lever in an unlooked position of the rod. A first and a second control member are provided for controlling two operations, wherein in a first operation the rod is unlocked for horizontal sliding while maintaining the memorized position and wherein in a second operation the lever and the hook-shaped member are disengaged.

BRIEF DESCRIPTION OF THE DRAWINGS

Embodiments of the invention are shown, by way of non-limiting examples, in the accompanying drawings, wherein.

DESCRIPTION OF PREFERRED EMBODIMENTS

Figure 2:
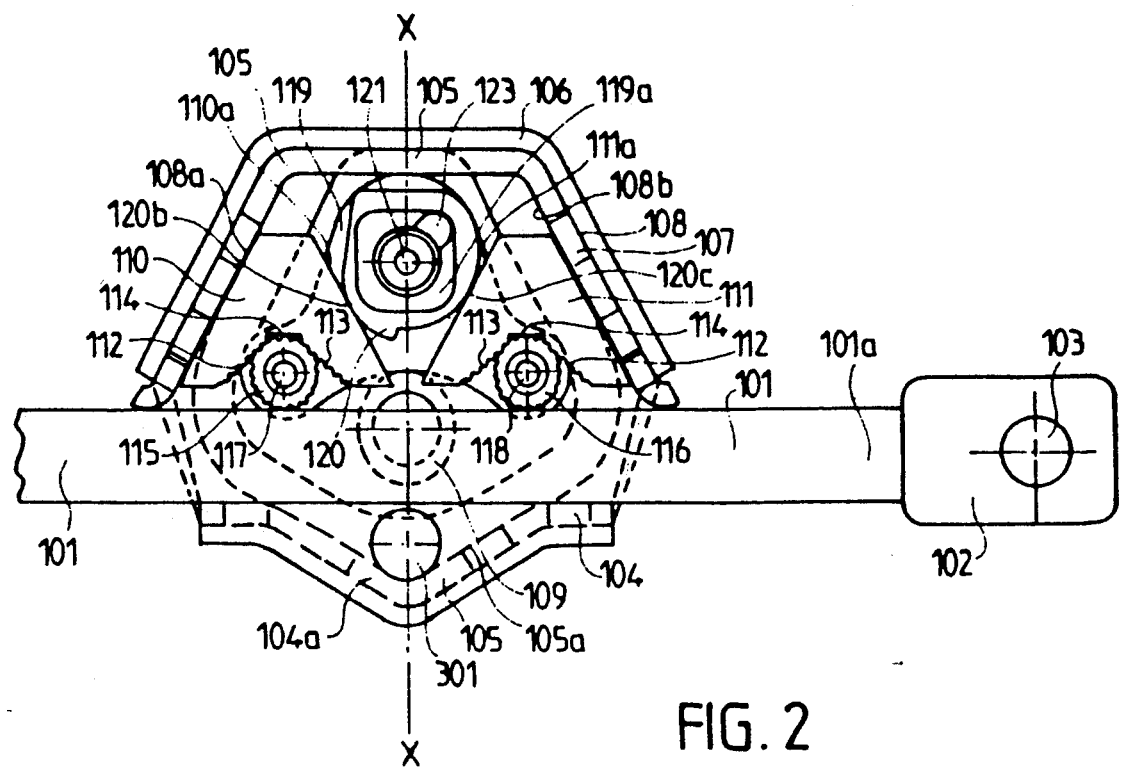
FIG. 2 is a side elevation view, partly in cross section, of a rectilinear displacement mechanical jack locking device comprising an inertia safety locking member.

Referring now to the drawings, FIG. 2 shows diagrammatically a jack rod 101 which is rectilinear and has a rectangular or square cross-section.

Figure 1:
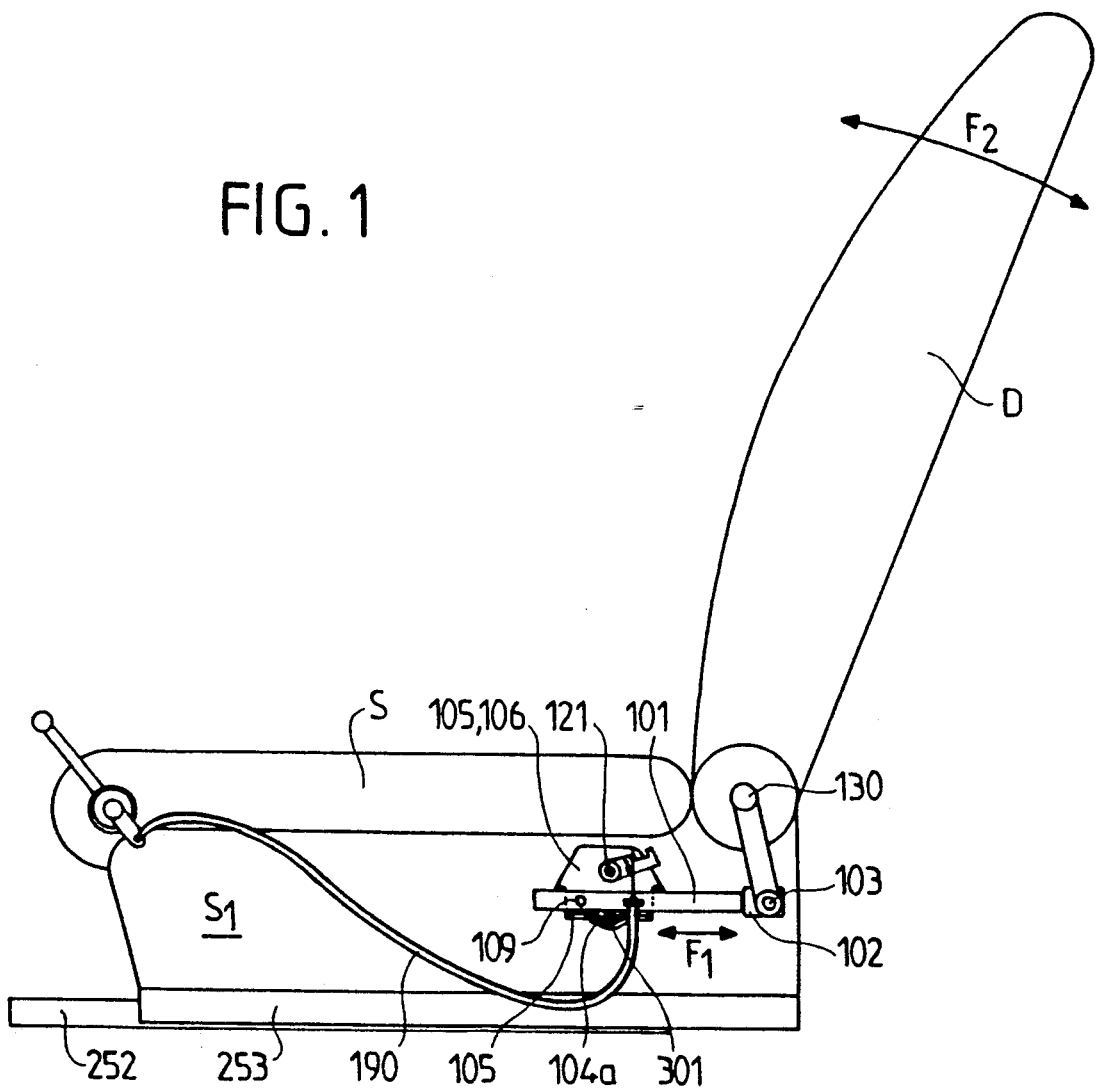
FIG. 1 is a side elevation view, partly in diagrammatic cross section, showing a mechanical jack according to the invention mounted as an inclination adjusting device of the back portion of a seat.

The rod 101 has one end 101a carrying a jack coupling 102 made of a head having a hole 103 adapted for fixation of the jack rod 101 on a member which is, for example, rigidly connected with a mobile section of a slide. In the present case and as shown in FIG. 1, the hole 103 is adapted for fixation of the jack rod 101 on a rod rigidly connected to a rotation pin 130 for articulating the back portion D of a seat S1. The seat S1 carries a casing 105 which is described in full detail hereafter.

Referring again to FIG. 2, the rod 101 bears on parts 104 of the hollow bottom of an inner casing 105 having in elevation a substantially polygonal shape. The inner casing 105 is covered by a lid portion 106 to form a composite casing, parts 105 and 106 connected to one another by bent lugs 107 engaging cutouts 108 provided in the lid portion 106.

Figure 3:
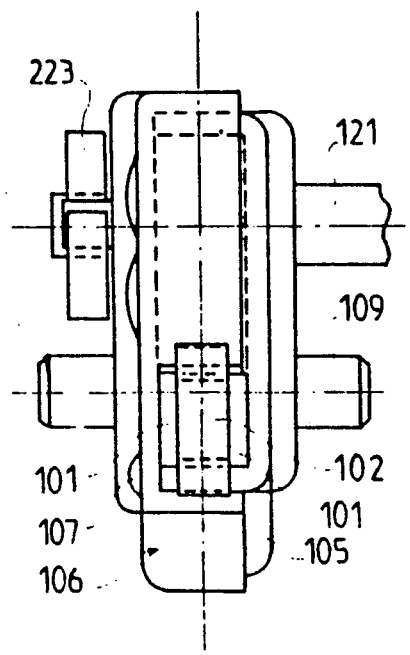
FIG. 3 is a front elevation view corresponding to FIG. 2.

On both sides of the casing 105, 106, there is provided a circular member 109 (see FIG. 3) for attaching the casing 105, 106 either to the armature of a seat, or to a point of another adjusting mechanism, thereby forming the second fixation point of the rectilinear stroke jack in the embodiment of FIG. 1.

The circular members 109 are placed in the vertical median axis X-X of the casing 105, 106. Slanting sides 108a, 108b of the casing 105 are used as guides for two V-shaped locking members 110, 111 the inner space of which is machined for forming two toothed inner slanted portions 112, 113 spaced apart by a distance 114. The toothed inner slanted portions 112, 113 are adapted for cooperating with toothed rollers 115, 116, mounted on pins 117, 118 extending beyond the side faces of the rollers 115, 116. The pins 117, 118 are mounted on a hat shaped member 119.

A cam 120 is placed between the two V-shaped locking members 110, 111, and the movement of the cam 120 is controlled by a shaft 121. The assembly comprising the toothed rollers 115, 116, the V-shaped locking member 110, 111, the hat-shaped member 119 and the cam 120 is enclosed in the casing 105, 106. The shaft 121 can be controlled in rotation either by a lever, or by any other desired rotary means (not shown). At least one boss 123, which is rigidly connected with the shaft 121, is placed in the central recess 119a of the hat-shaped member 119, the cam 120 being centered by means of bores made in the inner casing 105, the lid portion 106 and the shaft 121.

Moreover, a spiral spring 223 (see FIG. 3) is fixed via one of its ends to the shaft 121 and via its other end to a stud connected with the lid portion 106. It should be noted that reference numerals 120b and 120c designate the contact points of the cam 120 with the side faces 110a, 111a of the V-shaped locking member 110, 111.

Finally, the spiral spring 223 has maintains the rollers 115, 116 in a clamped position, via the V-shaped locking members 110, 111 and the cam 120, on the rectilinear rod 101 of a square or rectangular section.

As may be seen in FIG. 2, a fluted roller 301 is placed at the point of convergence of the oppositely slanted inner elements 104a, 105a of the casing 105 and is normally at rest in this position.

Thus, by rotating the shaft 121 in an anti-clockwise direction, it is possible to cause a slight rotation of the cam 120, the protrusions 120b, 120c of which will release the pressure which is exerted by the cam 120 on the V-shaped locking members 110, 111. Thus the toothings 112, 113 of the V-shaped locking members 110, 111 will disengage from the toothings of the toothed rollers 115, 116 which commonly are firmly bearing on the upper face of the rod 101 while locking the rod 101.

The rod 101 is therefore freed and can be displaced in the opposite directions shown by the double arrows F1 (FIG. 1).

In some cases and in order to provide, when the cam 120 is retracted, an easy lifting of the toothed rollers 115, 116, it is possible to provide, in addition, two curved springs having substantially the shape of an "$\Omega$" and centered around the circular members 109 rigid with the two sides of the casing 105 and lid portion 106.

When the rod 101 has been placed in the correct position, it suffices to rotate the shaft 121 in the clockwise direction so that the cam 120, by its protrusions 120b and 120c, will lock again the V-shaped locking member 110, 111 which move downwardly, thereby maintaining the toothed rollers 115, 116 on the upper face of the jack rod 101.

In case there is an impact at the moment when the passenger occupying the seat adjusts the back portion D (in the case of FIG. 1, a movement in direction of arrow F2) or the position of the seat portion S either forward or backward or by lifting or lowering the seat portion, the rod 101 being unlatched, this part of the seat will move under the effect of a fierce braking at the initial speed of the vehicle. This could cause a serious accident. But, since the fluted roller 301 also moves at the initial speed of the vehicle, the fluted roller 301 will move upwardly on the slanted inner elements 104a, 105a, either to the right or to the left, and will come immediately in contact with the underside of the rod 101, thereby wedging the rod 101 between the lower portions of the lower casing 105 and the fluted roller 301, thus avoiding a serious accident.

The wedging occurs very quickly since the right hand side or the left hand side slanted inner elements 104a, 105a has a small inclination less than 30°, and an instantaneous control is obtained which does not damage the parts of the mechanical jack.

Finally, it should be mentioned that the fluted roller 301 is of a hardened material so as to allow a penetration of its teeth in the rod 101 and the corresponding slanted inner element of the casing 105.

Figure 4:
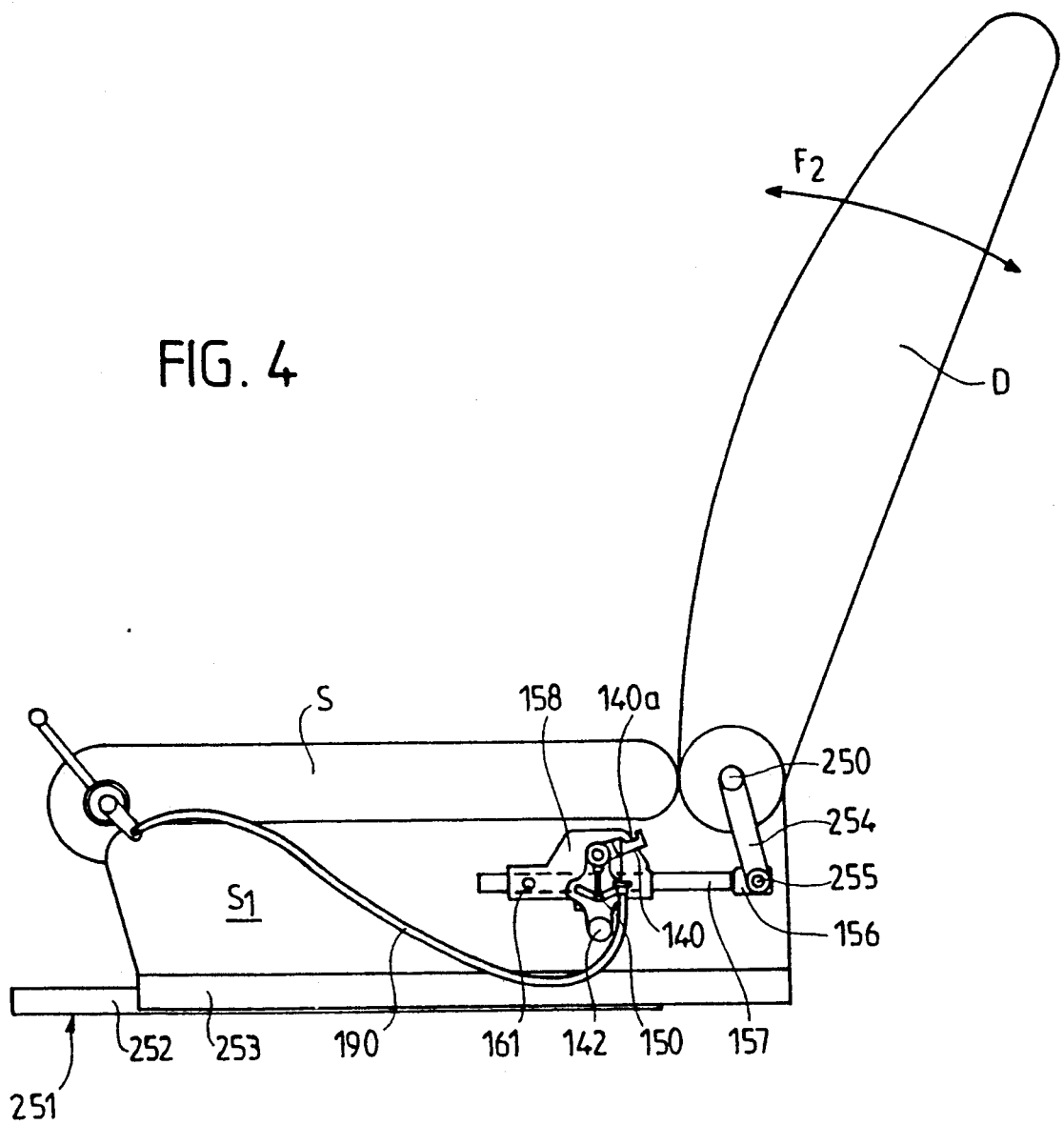
FIG. 4 is a side diagrammatic elevation view of a seat provided with an inertia safety locking member with a fly-weight.

In FIG. 4, there is shown a seat S1 comprising, in its upper portion, a seat portion S, and in its rear portion, a back portion D, the back portion D being articulated on at least one pin 250 rigidly connected with the armature of the and S1 and thereby allowing easy forward and backward pivoting in the directions of arrow F2.

The armature of the seat S1 is mounted on at least one slide 251, generally two slides 251, comprising a lower section 252 and an upper section 253. Of course, a control member, known per se but not shown, allows a latching with assistance of a toothing of the sliding upper section 253 onto the fixed lower section 252 which is rigidly connected with the vehicle floor.

The articulation pins 250 of the back portion D are rigidly connected with arms 254 which allow the control of the forward and backward movement of the back portion in directions of the arrow F2.

Figure 5:
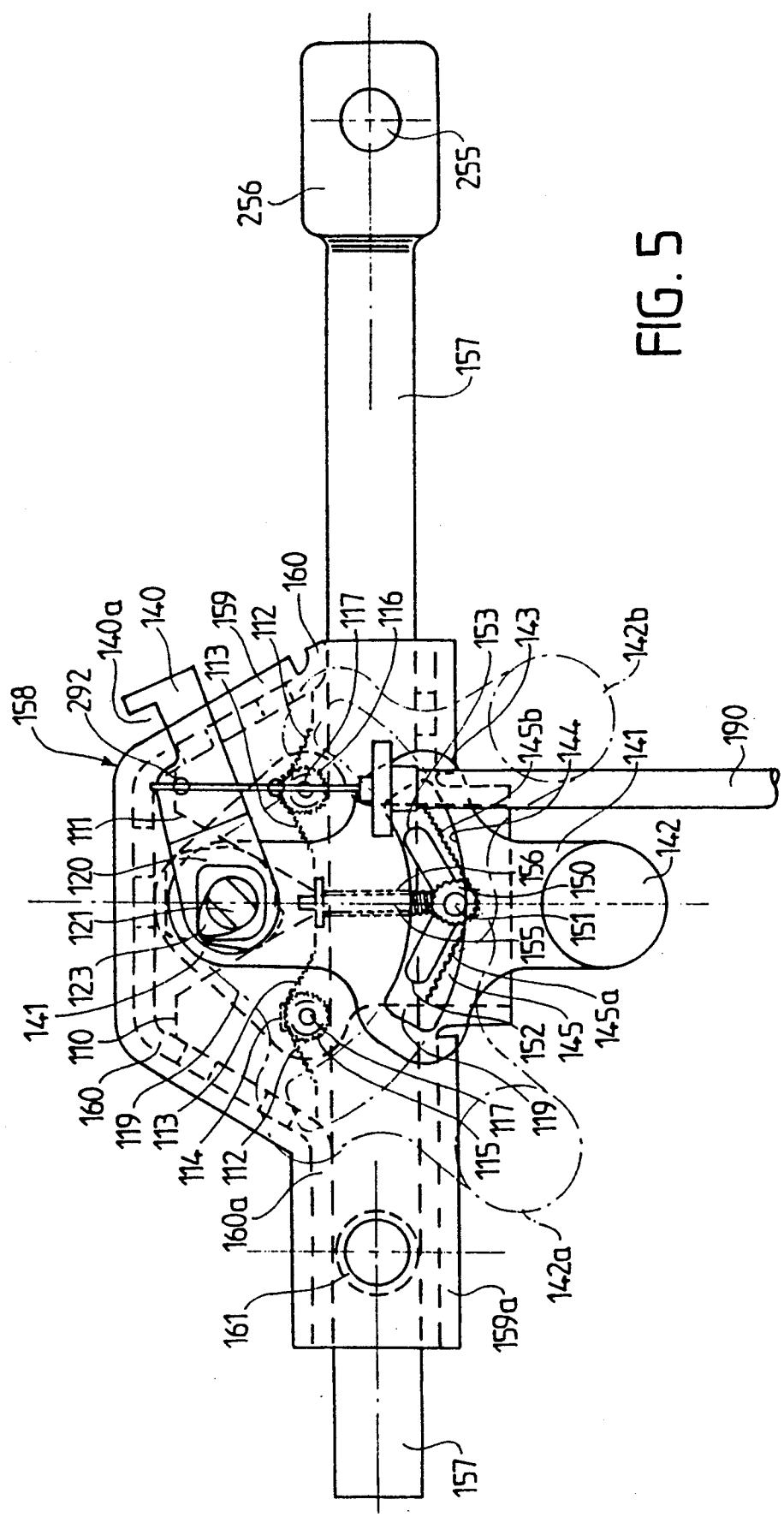
FIG. 5 is an enlarged scale of a jack mounted on the seat of FIG. 4.

The free end of each arm 254 carries a pin 255 which is coupled to the head 156 of the rod 157. The rod 157 extends into a casing 158 (see FIG. 5) made of two shells, one being an outer shell 159 and the other an inner shell 160, which fit into one another and which are extended toward their front portions 159a, 160a in order to form a guide for the rod 157 (FIG. 5). The casing 158 is held on the armature S1 of the seat by cylindrical bearing surfaces 161.

As already indicated above, the inside of the casing 158 contains two V-shaped locking members 110, 111 each having the shape of a two-pointed hat. The inner space of the "V" is machined in order to form two toothed inner slanted portions 112, 113 spaced apart by a distance 114. The V-shaped locking members 110, 111 are guided by the inner side walls of the inner shell 160. Moreover, as already mentioned, the V-shaped locking members 110, 111 can be locked or unlocked by a cam 120 actuated by the shaft 121. This shaft 121 controls a rotation of at least one boss 123 which lifts the hat-shaped member 119 in order to disengage the two V-shaped locking members 110, 111 the inner slanted portions 112, 113 of which cooperate with toothed rollers 115, 116 mounted on pins 117, 118 rigidly connected with the hat-shaped member 119.

It should also be noted that the shaft 121 carries, in addition to the cam 120, outside the casing 158 a lever 140 and a pendular member 141 having at its lower portion a fly-weight 142. The pendular member 141 comprises an intermediate portion with a widened zone 143 in which is formed a window 144.

As in the case of FIG. 2, the lower portion of the casing 158 includes, underneath the rod 157, oppositely slanted inner elements 145 provided with toothings 145a, 145b. Inside the slanted inner elements a fluted roller 150, mounted on an axis 151 guided inside cutouts 152, 153 parallel to the toothings 145a, 145b, can roll. These cutouts 152, 153 are formed in the outer shell 159 and the inner shell 160.

When there is an abrupt impact, the fly-weight 142 moves along the toothings 142a or 142b according to whether the impact is from the front or from the rear of the rod 157 and, at that moment, the fluted roller 150 is pushed by its pin 151 either to the front or to the rear, thereby locking the underside of the rod 157, even in the case where for some reason the toothed rollers 115, 116 are not in a locking position, for example, at the moment when the inclination of the back portion D of the seat S1 is being adjusted.

Since the pin 151 of the fluted roller 150 is mounted on a pivoting rod 155 and is pushed back by a spring 156 when the fly-weight 142 resumes its central position the fluted roller 150 will come back under the combined action of the rod 155 and of the spring 156 to the median position (shown in FIG. 5), i.e., in a position where the rod 157 is no longer latched by the fluted roller 150.

Figure 6:
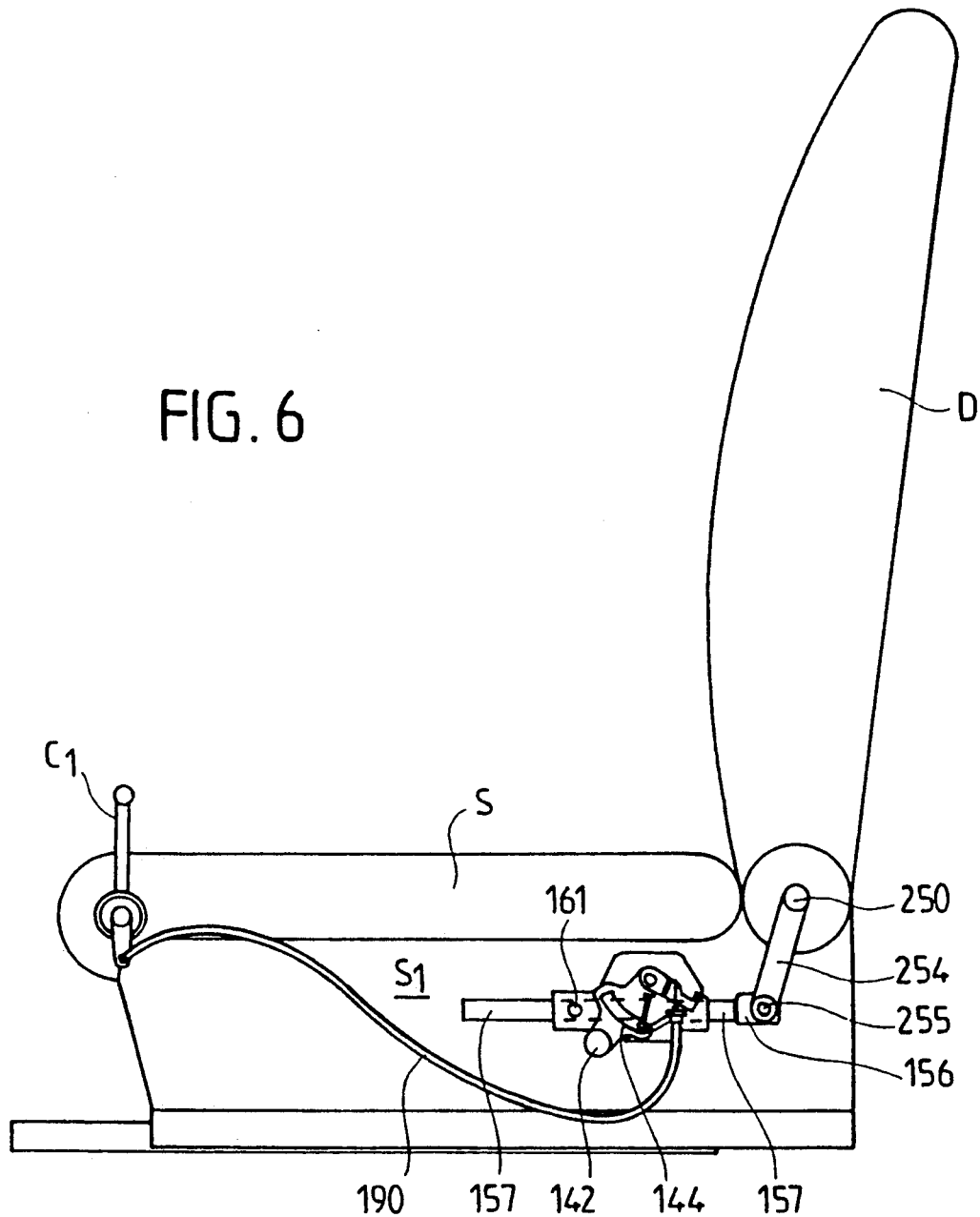
FIG. 6 is a diagrammatic side elevation view of a seat equipped with an inertia safety member with a fly-weight, the fly-weight being in the position it occupies when there is a frontal impact.

FIG. 6 shows the position of the fly-weight 142 when it locks the fluted roller 150 underneath the rod 157, thereby latching also firmly the back portion D of the seat S1 while the rod 157 is no longer in contact with the toothed rollers 115, 116 since the lever C1, having acted on a cable 190 (explained later on), has displaced upwardly the hat-shaped member 119 (shaft 121, cam 120 and lever 140), thereby unlatching the toothed rollers 115, 116.

Figure 7:
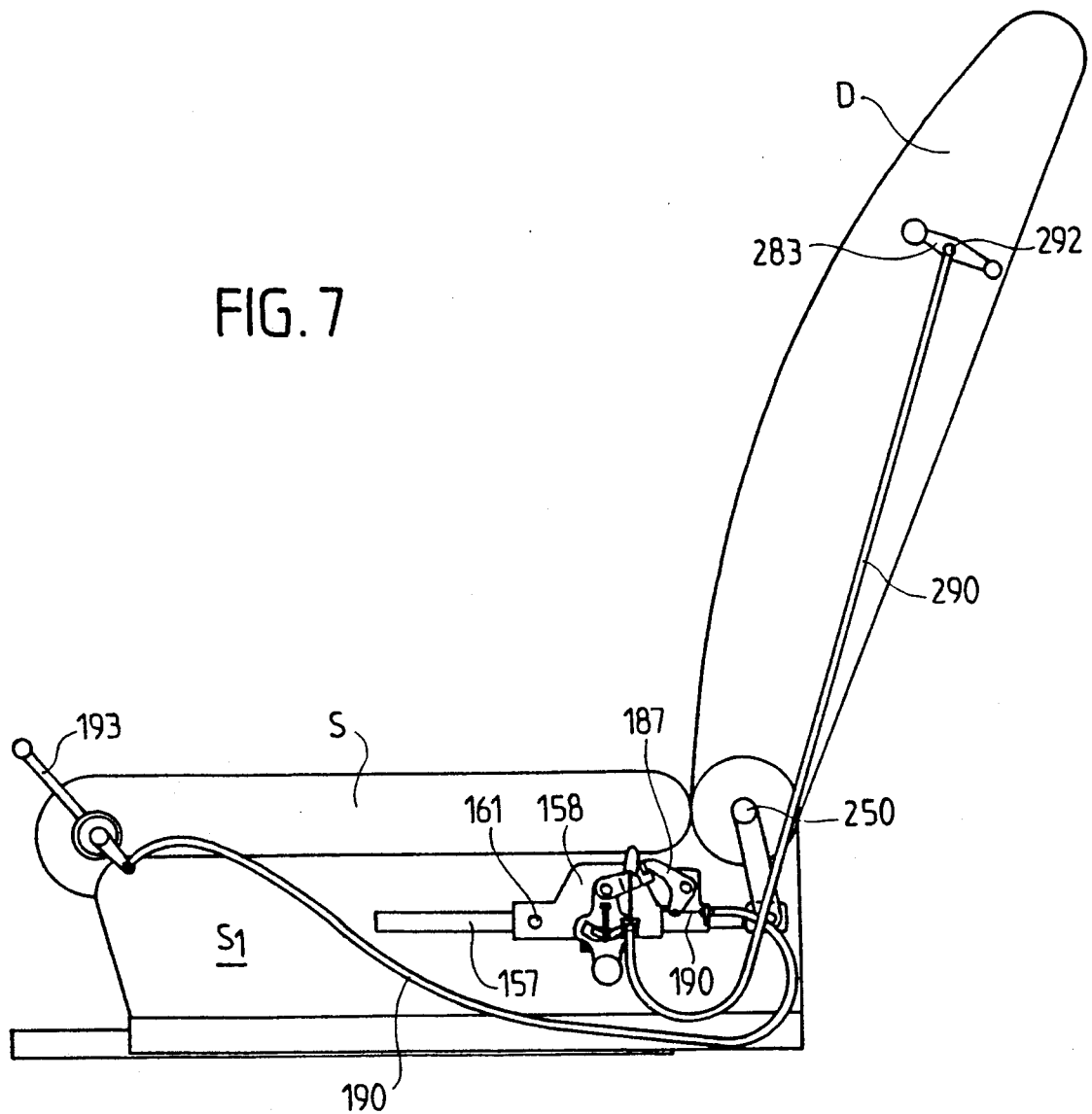
FIG. 7 is a diagrammatic side elevation view of a seat equipped with the inertia safety locking member with a fly-weight including a memory member for returning the jack member to the latched position.
Figure 8:
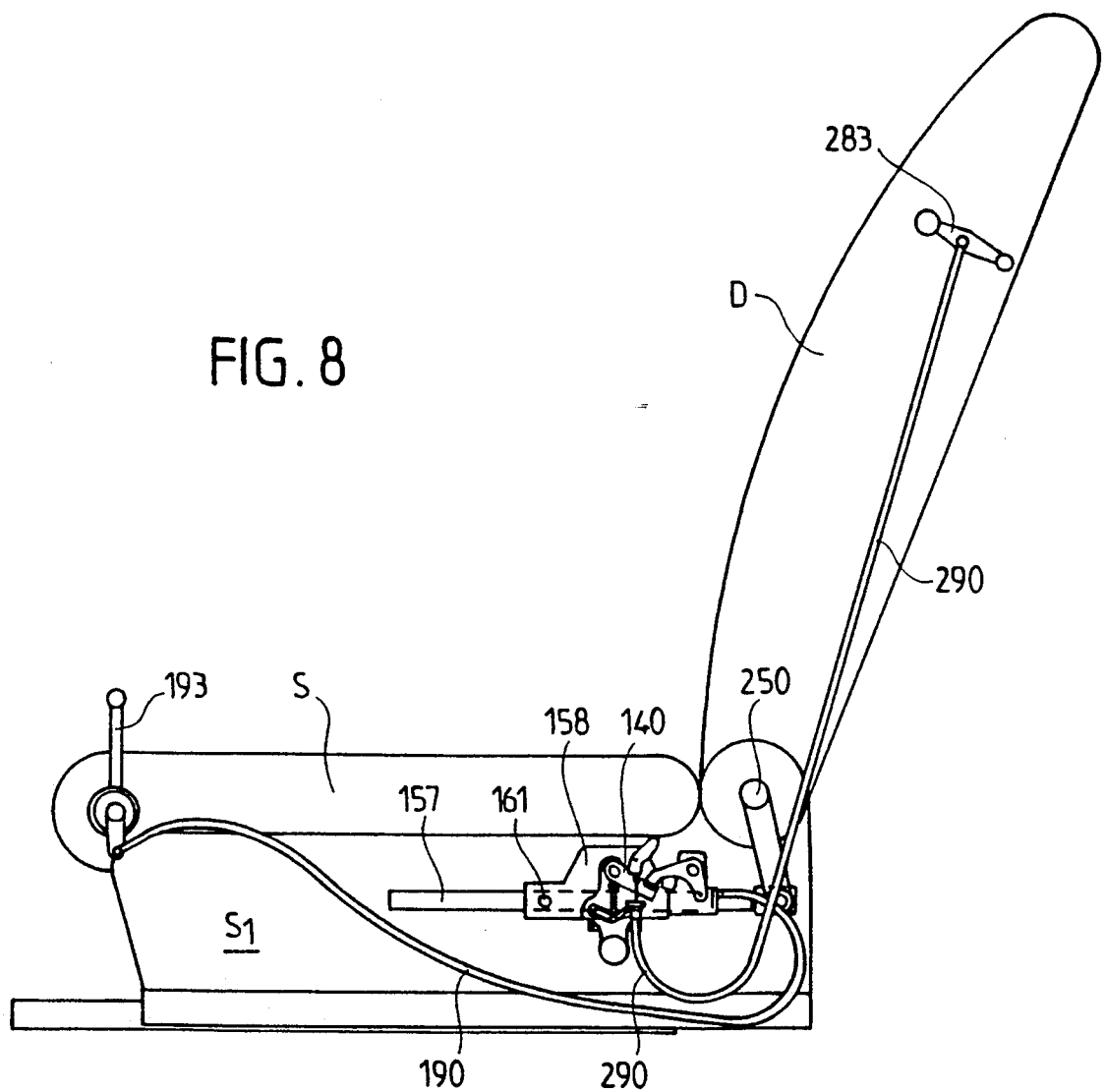
FIG. 8 is an elevation view corresponding to that of FIG. 7, the jack member shown during unlatching.

FIG. 7 shows a seat equipped with the inertia safety locking member with a fly-weight 142 such as hereabove described, but including moreover a return memory member for returning the rod to the latched position. Actually and as it may be seen in FIG. 10, the rod 157 carries, behind the casing 158, a housing 180 which can normally slide on the rod 157 and which contains inside a member 181 which is vertically movable inside the housing 180 and which is formed at its base with a V-shaped cut-out 182 which is toothed with a central clearance 182a for receiving a toothed roller 183 bearing on the upper portion of the rod 157. The member 181 can slide vertically in direction of the arrow F10 (FIG. 10) under the action of a cam 185 mounted on a shaft 186 controlled by a hook-shaped member 187 articulated on the shaft 186. The cam 185 is placed inside a cutout 189 formed in the member 181.

The lower end 187a of the hook-shaped member 187 is attached to a cable 190 which is a Bowden type cable and which can be seen very clearly in FIG. 7. The Bowden cable 190 is controlled by a lever 193 articulated at the front end of the seat S1.

The terminal upper end 187b of the hook-shaped member 187 ends in a bent portion 187c extending inwardly and cooperating with the cutout end 140a of the lever 140.

Figure 10:
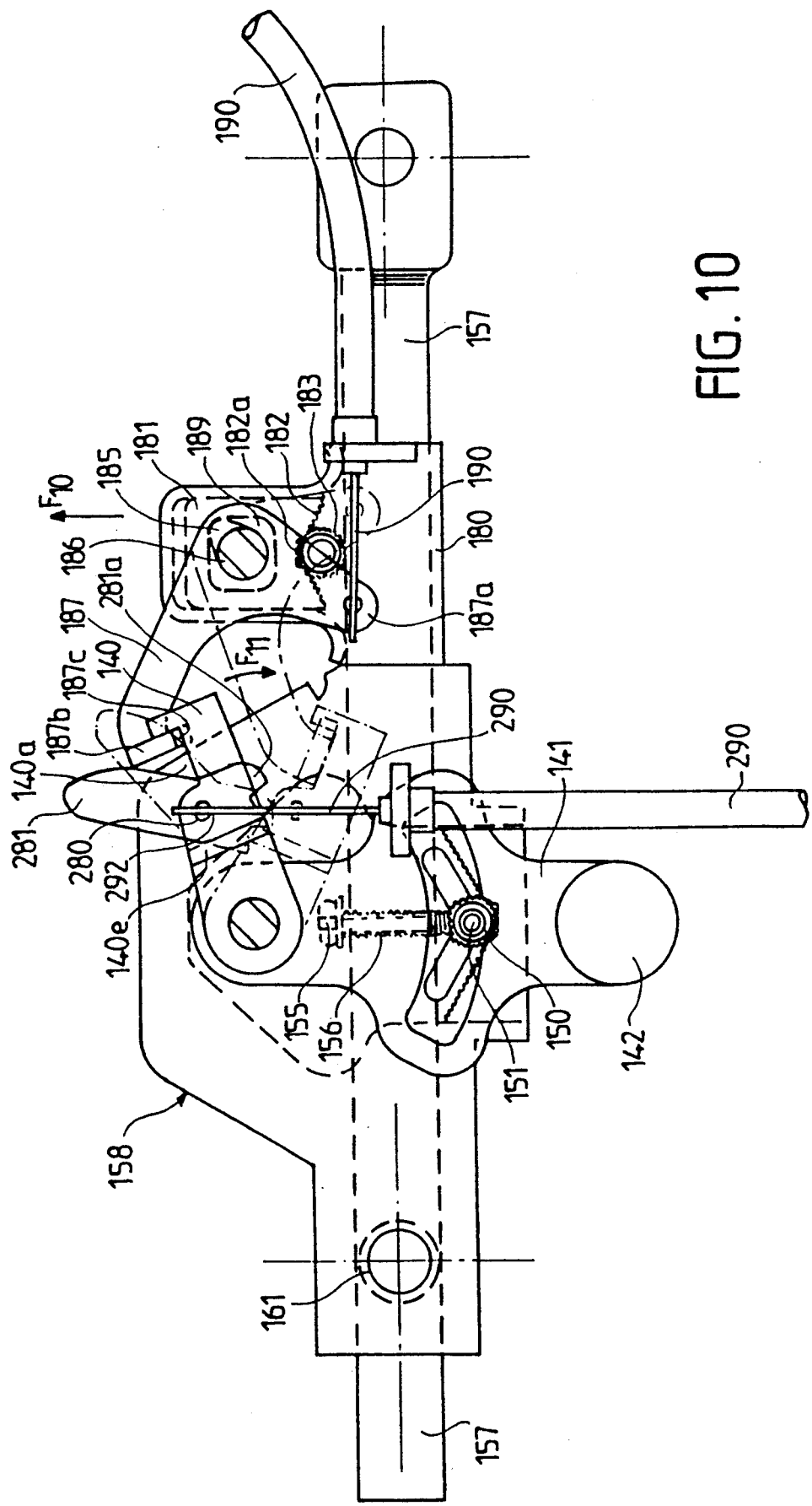
FIG. 10 is an enlarged view corresponding to the memory member of FIG. 8 during the unlatching phase.

Moreover, there is provided a pivoting finger 281 which is fixed on a pin 280 of the casing 158, and which, normally under the action of a spring (not shown) which is wound about the pin 280, will return the pivoting finger 281 to the position shown in a dashed line in FIG. 10.

As shown in particular in FIG. 7, a Bowden sleeve 290 and cable 292 connect the lever 140 to a control lever 283 articulated at the back portion D.

As shown in FIG. 10, the lever 140 is held in a lower position (as shown in a dashed line) due to the fact that the finger 281 locks this lever 140 with assistance of the notch 281a cooperating with an abutment or rectilinear boss 140e provided on the lever 140.

In order to tilt the back portion forwardly (FIG. 9), the lever 283 is rotated in the direction of arrow F9 and entrains the cable 292 guided by the sleeve 290 which acts on the lever 140. When the lever 140 is lowered as shown by the arrow F11, the end 281a of the finger 281 comes into contact with the zone 140e. At the end of the stroke of the lever 140, the notch 281a of the finger 281 cooperates with the rectilinear boss (abutment) 140e and therefore holds the lever 140 in the unlocked position of the jack.

Thus, the casing 158 is disengaged from the casing 180 which remains in position, and it is then possible to forwardly pivot the back portion D (see FIG. 9) and bring the whole seat S1 forward while memorizing the normal position of this seat. Actually, the only thing to do is to return the seat in order to resume the position shown in FIG. 7.

Figure 9:
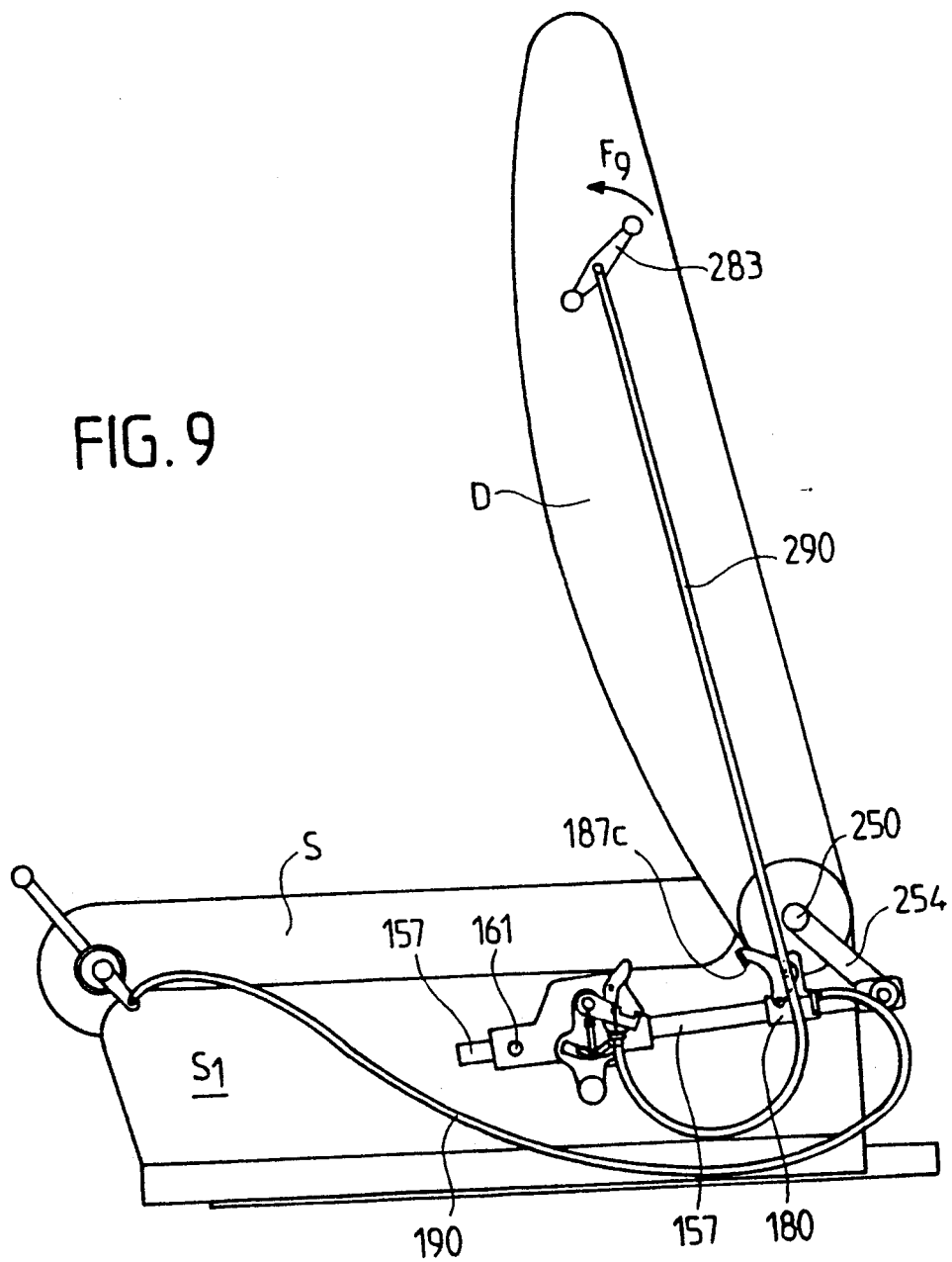
FIG. 9 is an elevation view corresponding to that of FIG. 8, the jack member being unlatched.
Figure 11:
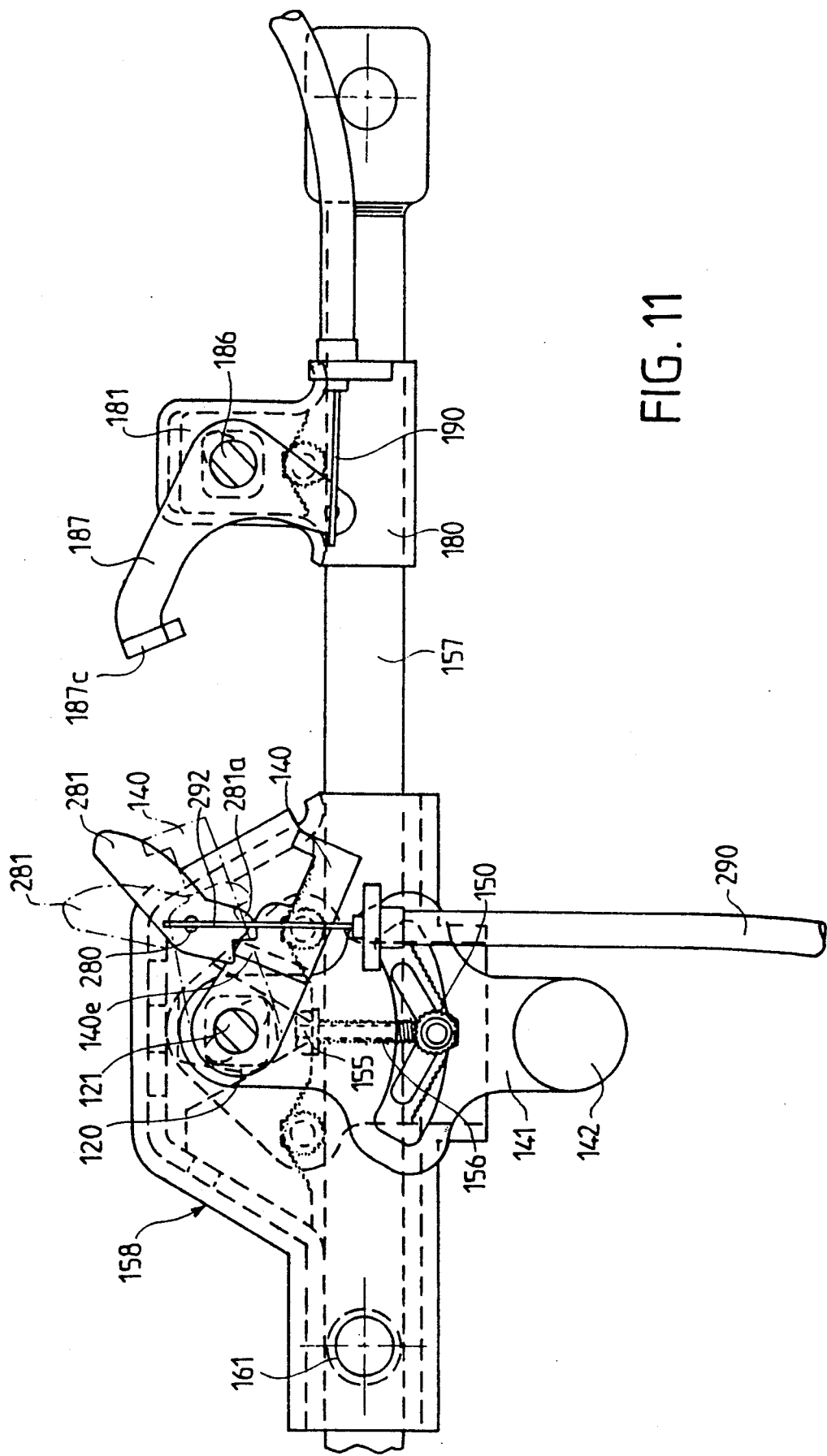
FIG. 11 is an enlarged side elevation view showing the jack member being unlatched according to FIG. 9.

FIG. 11 shows the position of the casing 158 which is moved when the back portion D occupies the position of FIG. 9. In this case, the housing 180 is still in the memorized position (FIG. 9). When the back portion D returns to the position of FIG. 7, the end 187c of the hook-shaped member 187 comes into contact with the portion 281 of the finger 281 positioned at the lever 140. This finger 281 then rotates in the anti-clockwise direction in order to disengage the lever 140 and to allow the cam 120 to resume its latching position by pushing the toothed rollers 115, 116 onto the rod 157. A locking of the seat back D in the position shown in FIG. 7 results.

The present invention is, of course, in no way restricted to the specific disclosure of the specification and drawings, but also encompasses any modifications within the scope of the appended claims.

What I claim is:

1. A device for locking a rectilinear displacement mechanical jack, comprising:
    a casing of a substantially polygonal shape having a lower and an upper portion, said lower portion having two oppositely slanted inner elements having a point of convergence at lower ends thereof;
    at least one rod guided in said lower portion of said casing above said oppositely slanted inner elements;
    a fluted roller resting in a displaceable manner at said point of convergence, said fluted roller, upon impact, rolling up one of said oppositely slanted inner elements and engaging said rod for locking said rod;
    V-shaped locking members with an inner space with toothed inner slanted portions connected in a displaceable manner in said casing;
    said upper portion of said casing having slanted guides for said V-shaped locking members;
    a cam rotatably connected within said casing and positioned between said V-shaped locking members for controlling displacement of said V-shaped locking members along said guides; and
    toothed rollers, one said toothed roller positioned in said inner space of each said V-shaped locking member and cooperating with said toothed inner slanted portions, wherein in an initial locked position of said rod said toothed rollers are forced by said V-shaped locking members onto said rod.

2. A device according to claim 1, wherein said oppositely slanted inner elements have an angle of inclination of between 15° and 30°.

3. A device according to claim 1, further comprising a shaft and a pendular member with a first and a second end, said cam and said first end of said pendular member connected to said shaft, said pendular member having a fly-weight at said second end and an intermediate portion with a window;
    said fluted roller having an axially extending pin cooperating with said window;
    each said oppositely slanted inner elements having a toothing for cooperating with said fluted roller; and
    wherein on impact said pendular member is moved from an initial position in the direction of one of said toothings of said oppositely slanted inner elements and said roller is displaced in said same direction for engaging said rod for locking said rod.

4. A device according to claim 3, wherein said casing has cutouts, said pin of said fluted roller guided in said cutouts.

5. A device according to claim 3, further comprising:
    a memory member comprising a housing slidably connected to said rod and a hook-shaped member pivotably connected to said housing;
    a lever connected to said shaft, said lever having an abutment, said lever engaging said hook-shaped member in a memorized position;
    a finger connected pivotably to said casing and engaging said abutment of said lever for locking said lever in an unlocked position of said rod; and
    a first and a second control member for controlling two operations, wherein in a first said operation said rod is unlocked for horizontal sliding while maintaining said memorized position and wherein in a second said operation said lever and said hook-shaped member are disengaged.

* * * * *

UNITED STATES PATENT AND TRADEMARK OFFICE
CERTIFICATE OF CORRECTION

PATENT NO. : 5,301,569

DATED : April 12, 1994

INVENTOR(S) : Georges Droulon

It is certified that error appears in the above-identified patent and that said Letters Patent is hereby corrected as shown below:

On the title page, item [75], change "Orne" to --Flers--.

Signed and Sealed this

Thirteenth Day of September, 1994

Attest:

BRUCE LEHMAN

*Attesting Officer*    *Commissioner of Patents and Trademarks*